No. 641,581. Patented Jan. 16, 1900.
L. L. J. CURRENCE.
NUT CRACKER.
(Application filed Apr. 27, 1899.)
(No Model.)

Witnesses
Jno Annie
Gladys D. Thompson.

Inventor
L. L. J. Currence.
by R. S. & A. B. Lacey, his Attorneys.

UNITED STATES PATENT OFFICE.

LORING L. J. CURRENCE, OF ELKINS, WEST VIRGINIA.

NUT-CRACKER.

SPECIFICATION forming part of Letters Patent No. 641,581, dated January 16, 1900.

Application filed April 27, 1899. Serial No. 714,742. (No model.)

*To all whom it may concern:*

Be it known that I, LORING L. J. CURRENCE, a citizen of the United States, residing at Elkins, in the county of Randolph and State of West Virginia, have invented certain new and useful Improvements in Nut-Crackers; and I do hereby declare the following to be a full, clear, and exact description of the invention, such as will enable others skilled in the art to which it appertains to make and use the same.

This invention relates to an implement or device for cracking nuts and preventing injury to the fingers, the scattering of fragments of shell, and the crushing of the kernel.

The device partakes of the nature of a combined holder and cracker; and it consists of an anvil or lower jaw and a hammer or upper jaw, the nut to be cracked being operated upon between the jaws, the latter being concave in their gripping-faces to prevent the scattering or flying about of the shell when broken.

For a full understanding of the merits and advantages of the invention and a clear comprehension of the details thereof reference is to be had to the following description and the figures of the drawings hereto attached.

While the drawings show the preferred embodiment of the invention, it is to be understood that various changes in the form, proportion, and minor details of construction may be made without departing from the nature or spirit of the invention or sacrificing any of the advantages thereof.

Figure 1:
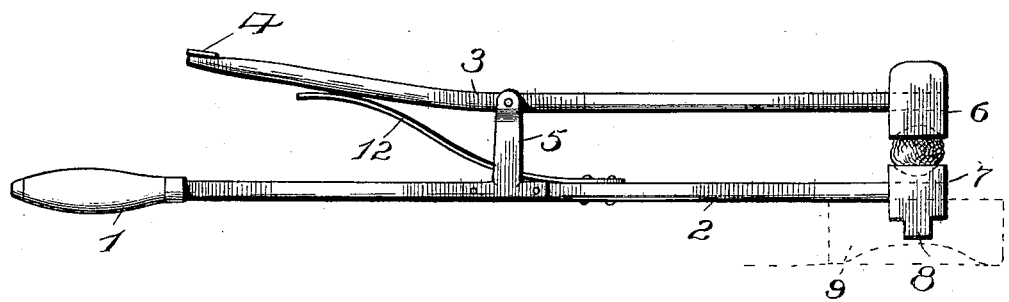
Figure 2:
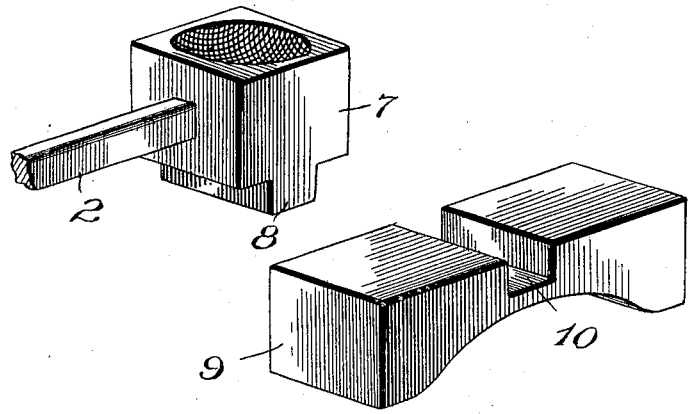
Figure 3:
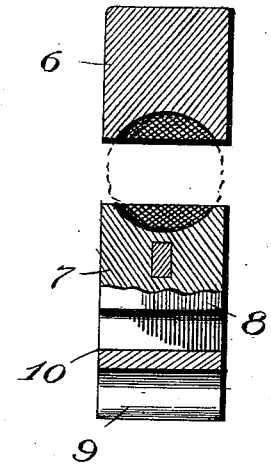

In the drawings, Figure 1 is a side elevation of an implement for attaining the objects of the invention and embodying the vital principles thereof. Fig. 2 is a detail perspective view of the bed or block and the anvil or lower jaw of the device supported thereby. Fig. 3 is a sectional detail view.

Corresponding and like parts are referred to in the following description and indicated in all the views of the drawings by the same reference characters.

In its organization the implement comprises a bar 2, provided at one end with a handle 1 and at its opposite end with an anvil or jaw 7. A standard or post 5 projects from the bar 2 about at a right angle and forms a support for a bar 3, which is fulcrumed thereto medially of its ends. The pivoted bar 3 is provided at one end with a rest 4 and at its opposite end with a holder or jaw 6. A spring 12 is interposed between the two bars 2 and 3 and serves to hold the jaws 6 and 7 in close relation or normal position. This spring is secured at one end to the bar 2, in advance of the standard or post 5, and its opposite end exerts an outward pressure upon the end of the bar 3 in the rear of the post 5.

The jaws 6 and 7 are recessed in their inner or opposing faces, forming seats to receive the nut to be cracked, the recesses being preferably of concave formation to conform to the general outline of nuts. The anvil or lower jaw 7 is provided with a reduced pendent portion 8, which is adapted to fit within a recess 10, formed in the top side of a bed or block 9. The bed or block 9 is of sufficient weight and lateral extent to sustain and equalize the blow or force expended when breaking the shell of the nut to release the kernel.

The implement can be used in a variety of ways. In the event of the shell being comparatively thin the nut can be placed upon the anvil or lower jaw and the hammer or upper jaw elevated by depressing the inner end of the bar 3 by downward pressure of the thumb upon the rest 4, which latter when released admits of the hammer falling quickly by the combined action of gravity and the tension of the spring 12, the resultant force being sufficient to crack the nut placed in position. In another use of the implement the nut to be cracked is placed between the jaws and is held in place by the action of the spring 12 in forcing the two jaws together. The device, with the nut gripped between the two jaws, is brought forcibly with one or the other of the jaws in contact with the block 9 or like unyielding surface, and as a result of the impact of the device against said block or surface the nut will be broken. When the nut comprises a thick and hard shell, the modes of use herein described will not give beneficial results and the following operation is resorted to. The nut is gripped between the jaws and the device placed upon the bed or block 9, with the part 8 entering the recess 10. The upper jaw is struck a smart blow by means of a hammer or like tool, thereby resulting in cracking the nut, as will be readily appreciated. In any of the various modes of use the shell when broken is prevented from scattering or flying about by reason of the peculiar formation of the seats in the gripping-faces of the jaws 6 and 7, which embrace and hold the fractured parts of the shell and prevent the crushing of the meat or kernel.

Having thus described the invention, what is claimed as new is—

1. A nut-cracker comprising a support provided with a jaw having a recess in its inner face, a bar pivoted intermediate of its ends to the said support and provided at one end with a rest for the application of power, a hammer applied to the opposite end of the pivoted bar and recessed to coöperate with the aforesaid jaw, and a spring interposed between the support and the pivoted bar, substantially as specified.

2. A nut-cracker comprising a bar, a handle at one end of the bar, an anvil at the opposite end of the bar provided with a recess, a standard secured to the bar at an intermediate point, a second bar pivoted at an intermediate point to the standard and provided with a rest at one end, a hammer at the opposite end of the pivoted bar recessed to correspond with the anvil, and a spring interposed between the two bars, substantially as set forth.

In testimony whereof I affix my signature in presence of two witnesses.

LORING L. J. CURRENCE. [L. S.]

Witnesses:
A. J. BARTLETT,
C. J. DANN.